US006546894B2

(12) United States Patent
Chrisco et al.

(10) Patent No.: US 6,546,894 B2
(45) Date of Patent: Apr. 15, 2003

(54) BIRD FEEDER

(75) Inventors: Larry L. Chrisco, Fairland, OK (US); Orval Lee Fick, Miami, OK (US)

(73) Assignee: Blitz U.S.A., Inc., Miami, OK (US)

( * ) Notice: Subject to any disclaimer, the term of this patent is extended or adjusted under 35 U.S.C. 154(b) by 0 days.

(21) Appl. No.: 09/791,363

(22) Filed: Feb. 23, 2001

(65) Prior Publication Data

US 2002/0117116 A1 Aug. 29, 2002

(51) Int. Cl.[7] .............................................. A01K 61/02
(52) U.S. Cl. .................................................... 119/52.2
(58) Field of Search ........................ 119/52.1, 53, 52.2, 119/52.3, 52.4, 53.5, 54, 57.8, 57.9; D30/124

(56) References Cited

U.S. PATENT DOCUMENTS

| | | | | | |
|---|---|---|---|---|---|
| 4,318,364 A | * | 3/1982 | Bescherer | ..................... | 119/51 |
| 5,033,411 A | * | 7/1991 | Brucker | ..................... | 119/52.1 |
| 5,558,040 A | * | 9/1996 | Colwell et al. | ............ | 119/52.2 |
| 5,572,948 A | * | 11/1996 | Womack | ..................... | 119/53 |

* cited by examiner

Primary Examiner—Charles T. Jordan
Assistant Examiner—Susan L Piascik
(74) Attorney, Agent, or Firm—Hovey Williams LLP

(57) ABSTRACT

A wildlife feeder has a generally tubular, upright housing or base unit that is designed to remain permanently attached to its means of support, such as an upstanding post or an overhead hanger, while refillable feed cartridges are readily removed from the housing as need be for refilling or cleaning. In its preferred form, the housing has a pair of internal, upright retaining sockets at its opposite ends that receive a pair of cylindrical, transparent cartridges. The cartridges are open at the top and closed at the bottom, with dispensing ports in the sidewalls thereof. A pair of tall window openings at opposite ends of the housing provide both unimpeded visual examination of the feed level of the cartridges from remote locations and means for removing the cartridges from and reinserting them into the housing. A simple lift and pivot action of the cartridge permits the user to release the cartridge from its holding socket and to withdraw it from the housing, while reinsertion is a simple reversal of the process.

6 Claims, 4 Drawing Sheets

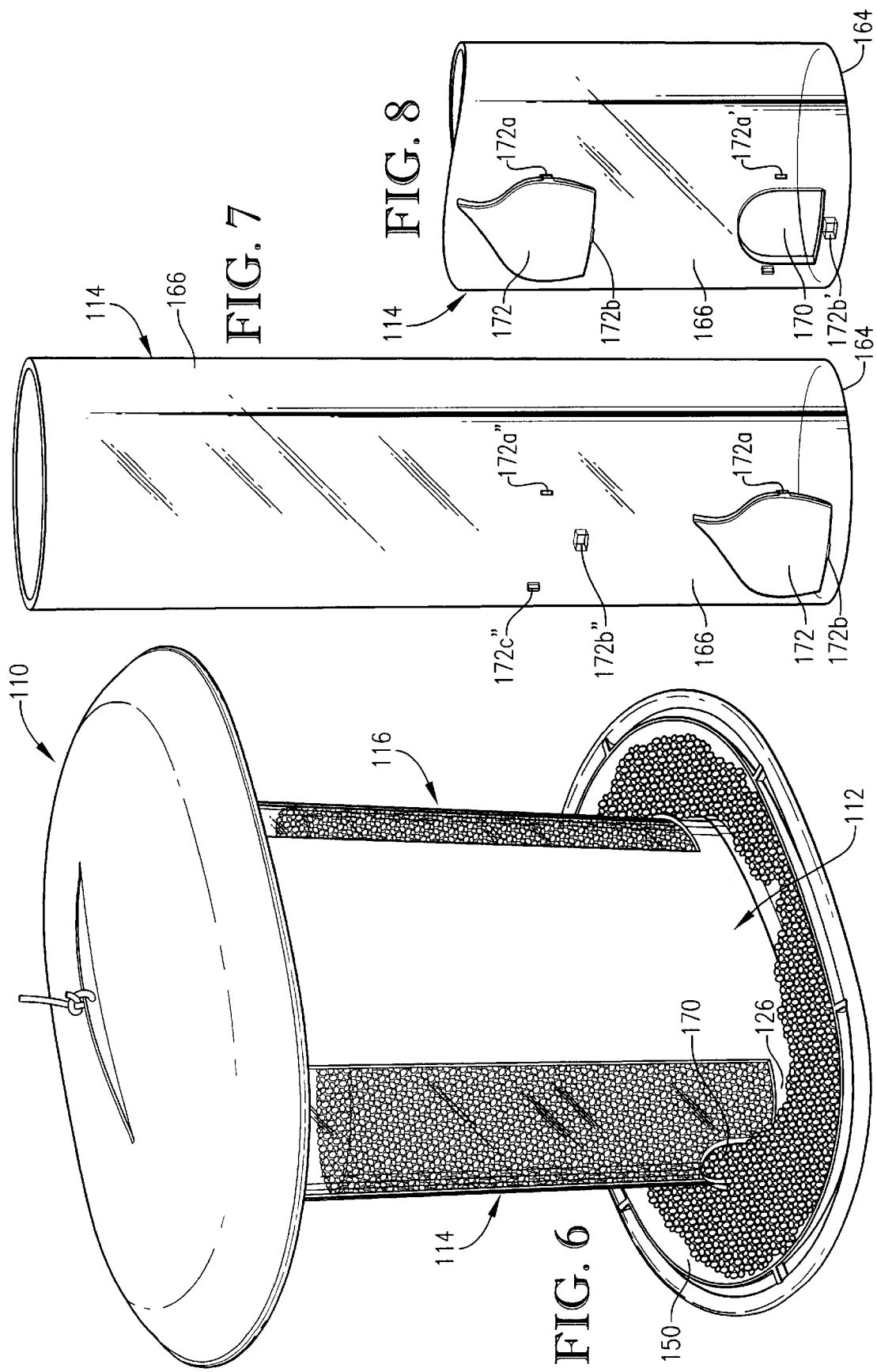

BIRD FEEDER

TECHNICAL FIELD

The present invention relates to the field of feeders for wildlife and, more particularly, to feeders for wild birds.

BACKGROUND AND SUMMARY OF THE INVENTION

Bird feeders are typically supported on posts or suspended from overhead structures such as tree limbs and the like. Consequently, it is common practice to refill such feeders at the feeding site while they remain fully attached to their means of support. The alternative requires completely disassembling the feeder and the support.

The present invention contemplates a feeder in which a base unit remains permanently attached to its means of support at all times, while one or more individual feed-dispensing cartridges are quickly and easily removed from the base unit when empty, refilled with feed at a convenient location, and then quickly and easily reinstalled in the base unit.

In one preferred form, the base unit comprises an upright housing having a hollow interior that is bounded by a continuous, annular, outer wall. The outer wall has a pair of relatively large, horizontally spaced window openings that expose a pair of upright receiving sockets within the housing adapted to receive and support a corresponding pair of transparent, cylindrical seed-dispensing cartridges. With the cartridges installed within their sockets, the window openings afford a clear view of the cartridges so that the home owner or other user can readily ascertain the level of feed within each cartridge.

Each cartridge is securely supported within its receiving socket, yet is readily removable therefrom by simply lifting the cartridge a short distance until its closed bottom wall clears a short, upstanding retaining wall, whereupon the cartridge can be withdrawn through the window opening. Likewise, after refilling, the cartridge can be quickly and easily reinstalled by inserting the cartridge through the window opening and placing it into its secured position behind the short retaining wall.

Each cartridge is closed at the bottom and open at the top so that refilling is accomplished through the top of the cartridge. Outlet ports in the sidewall of the cartridge provide a means for dispensing the feed. In one embodiment, the outlet ports are provided with internal deflectors or flow inhibitors that prevent feed from escaping through the ports while allowing birds perched outside the ports to reach in through the ports and take feed with their beaks.

Another embodiment locates the port adjacent the bottom of the cartridge and provides a feeding tray below the port that is adapted to receive and collect feed gravitationally from the port. In its preferred form, all parts of the feeder are molded from a synthetic resinous material.

BRIEF DESCRIPTION OF THE DRAWING FIGURES

Preferred embodiments of the invention are described in detail below with reference to the attached drawing figures, wherein:

FIG. 6 is an isometric view of a second embodiment of the invention in which the feed is dispensed by gravity into a feeding tray;

FIG. 7 is an enlarged isometric view of one of the feed-dispensing cartridges for the second embodiment; and FIG. 8 is a fragmentary isometric view of the cartridge of FIG. 7 illustrating a closure flap of the cartridge in its stored position uncovering the outlet port of the cartridge.

DETAILED DESCRIPTION OF THE PREFERRED EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
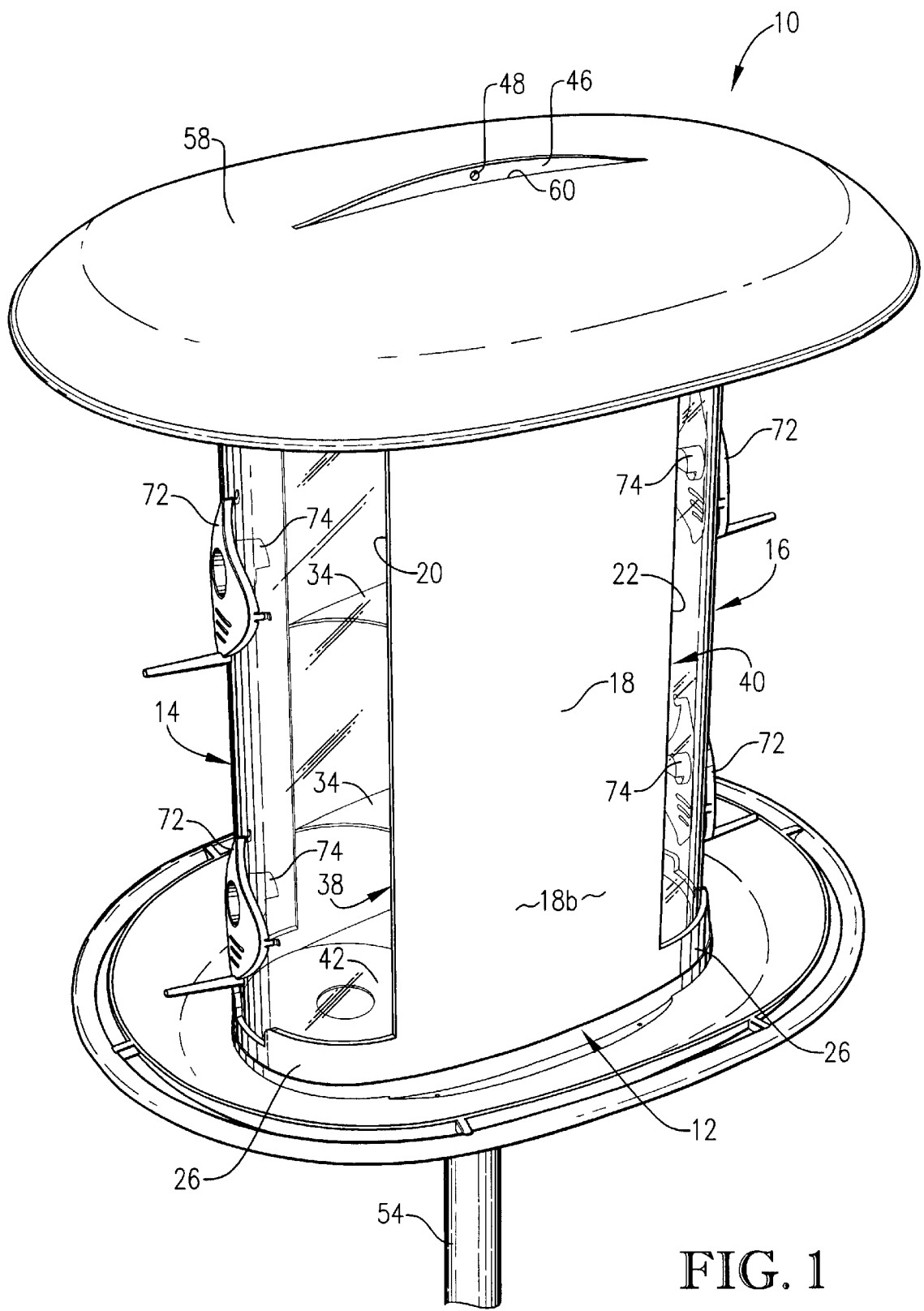
FIG. 1 is an isometric view of a feeder incorporating the principles of the present invention, the feeder being supported by an upright post and the feed cartridges being especially adapted to dispense feed through multiple outlet ports in the sidewalls of the cartridges.
Figure 5:
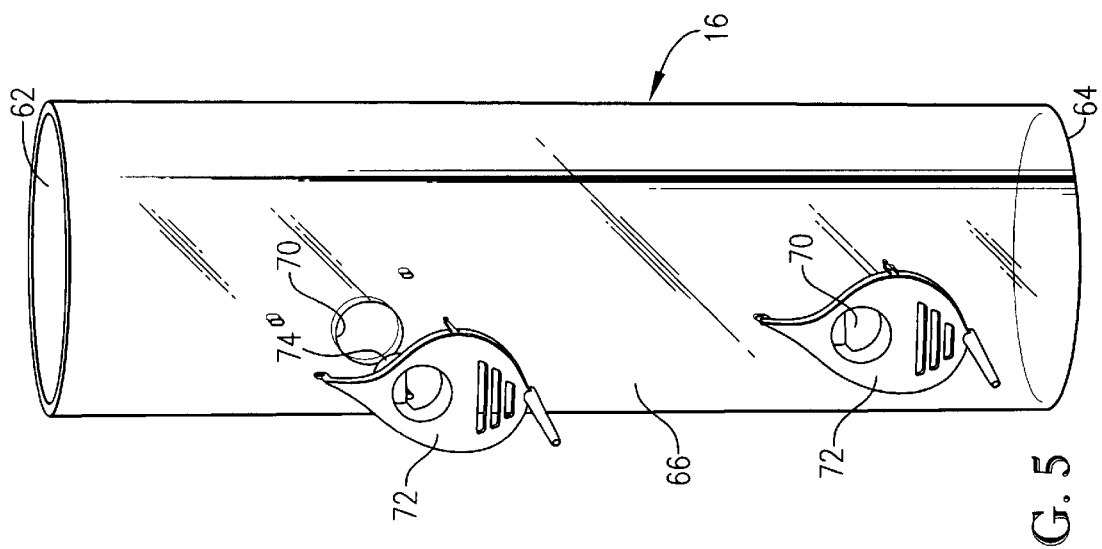
FIG. 5 is an isometric view of one of the feed-dispensing cartridges.

The feeder 10 in FIG. 1 broadly comprises a base unit or housing 12 that is adapted to remain permanently attached to a means of support for the feeder, and a pair of identical feed-dispensing cartridges 14 and 16 that are removably supported by housing 12. As will be apparent, it is within the scope of the present invention to have more than two cartridges, or only one of such cartridges, without departing from the principles of the present invention.

Housing 12 is generally oval-shaped in transverse cross section and has a continuous, annular outer wall 18 that defines a hollow interior. At its opposite ends, wall 18 is provided with a pair of oppositely facing window openings 20 and 22 that extend almost the full height of the housing. At the top and bottom of the housing, relatively short arcuate wall portions 24 and 26 remain at each window opening 20,22. As will be seen, the upper wall portions 24 serve as downwardly projecting retainers, while the lower wall portions 26 serve as upwardly projecting retainers.

Upright skeletal-like structure 28 is located inside housing 12 and includes a pair of full height ribs 30 and 32 projecting inwardly from opposite side panels 18a and 18b of wall 18. Each rib 30,32, in turn, carries a stack or vertical series of flat, vertically spaced, horizontally extending plates 34. The plates 34 on rib 30 are aligned horizontally with the corresponding plates 34 of the opposite rib 32, and each plate 34 has an arcuately concave edge 36 that is aligned horizontally with the arcuate edge of the opposing plate. Edges 36 of the stacked plates are vertically aligned with one another to define the upright, inner boundaries of a pair of cartridge-receiving sockets 38 and 40 at opposite ends of housing 12.

Depending upper wall portions 24 and upstanding lower wall portions 26 also help define sockets 38,40. Additionally, a floor 42 at the bottom of the housing and a horizontal top wall 44 at the top of the housing serve to define the lower and upper limits, respectively, of each socket 38,40. As will be seen, floor 42 also serves as a rest for cartridges 14 and 16 when they are installed.

Housing 12 has an integral hanger fin 46 projecting upwardly from top wall 44. Fin 46 is provided with a horizontal hole 48 through which a suitable length of wire, twine or other material may be threaded (as illustrated in the second embodiment of FIG. 6) so as to adapt feeder 10 for hanging from an overhead support such as a tree limb or the like.

A feeding tray 50 is fixedly secured to the bottom of housing 12 and includes a centrally disposed, upstanding collar 52 that passes through floor 42 and extends for a short distance therebeyond. Collar 52 is adapted to receive a mounting post 54 (FIG. 1) which enables feeder 10 to be supported from the ground by the post 54 in lieu of an overhead means of support.

It will be noted that plates 34 within the interior of housing 12 are configured to present a series of vertically aligned, circular holes 56 that are also vertically aligned with collar 52 such that when feeder 10 is mounted on post 54, post 54 projects upwardly through holes 56 and abuts top wall 44. A protective canopy 58 may be secured to the upper end of housing 12, the hanger fin 46 passing upwardly through a slit 60 in canopy 58.

Figure 3:
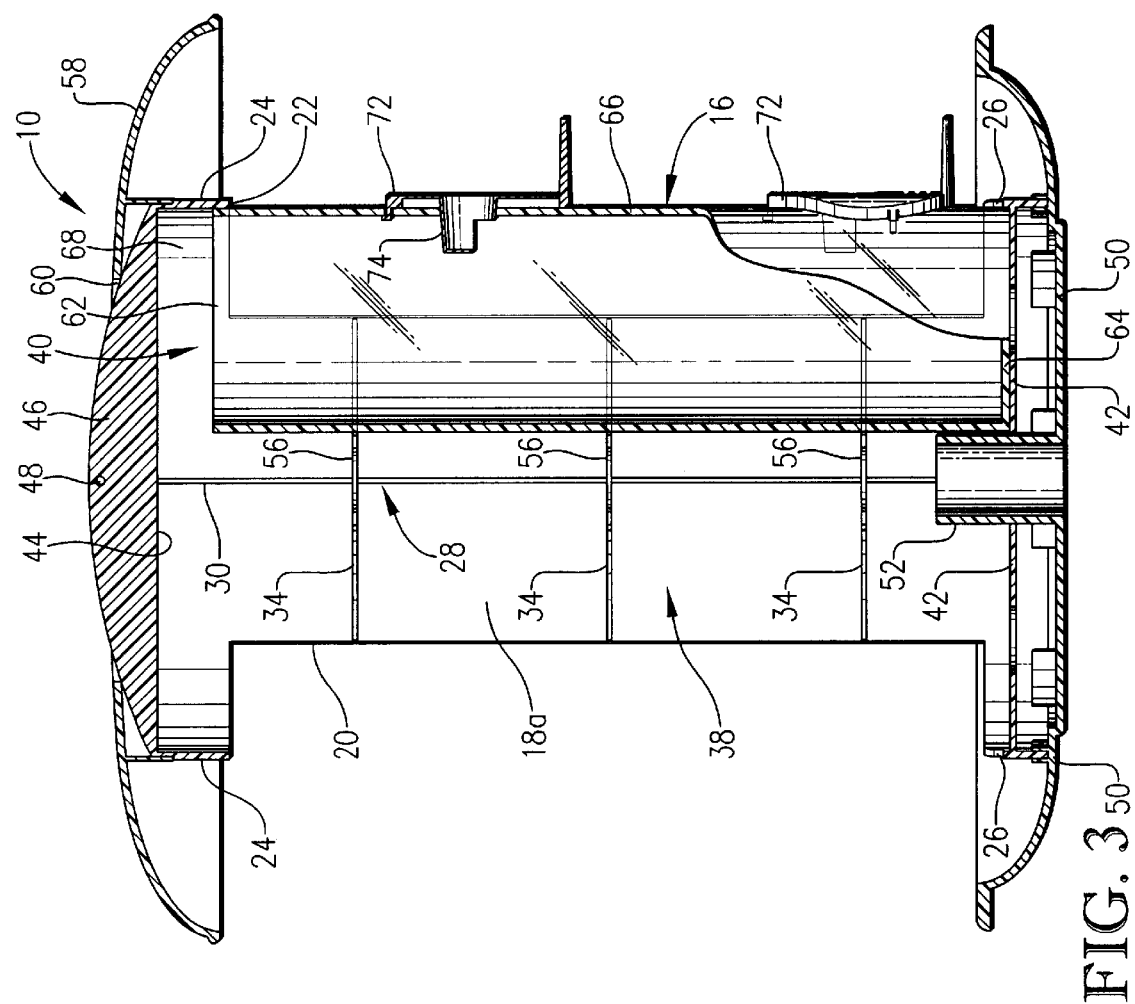
FIG. 3 is an upright, longitudinal cross sectional view through the feeder with one of the cartridges removed and the other cartridge partially broken away and shown in cross section to reveal details of construction.

Each of the cartridges 14,16 is completely transparent and is cylindrical in configuration, having an open top 62, a closed bottom 64, and a continuous annular side wall 66. Each cartridge 14,16 is somewhat shorter than the vertical distance between floor 42 and top wall 44 of housing 12 such that, when cartridges 14,16 are received within their sockets 38,40 as illustrated by cartridge 16 in FIG. 3 wherein closed bottom 64 rests upon floor 42, an overhead clearance space 68 is defined between cartridge top 62 and top wall 44.

The vertical dimension of each window opening 20,22, on the other hand, is somewhat less than the height of each cartridge 14,16 such that, when cartridges 14,16 are in sockets 38,40 and resting upon floor 42, upper wall portion 24 overlaps the upper extremity of each cartridge while lower wall portion 26 overlaps the lower extremity of each cartridge. Consequently, when situated within their sockets 38,40, the cartridges 14 and 16 are snugly and securely received and cannot escape horizontally in view of the confining action afforded by wall portions 24,26 and edges 36 of plates 34 that complementally receive cartridge sidewall 66.

Figure 2:
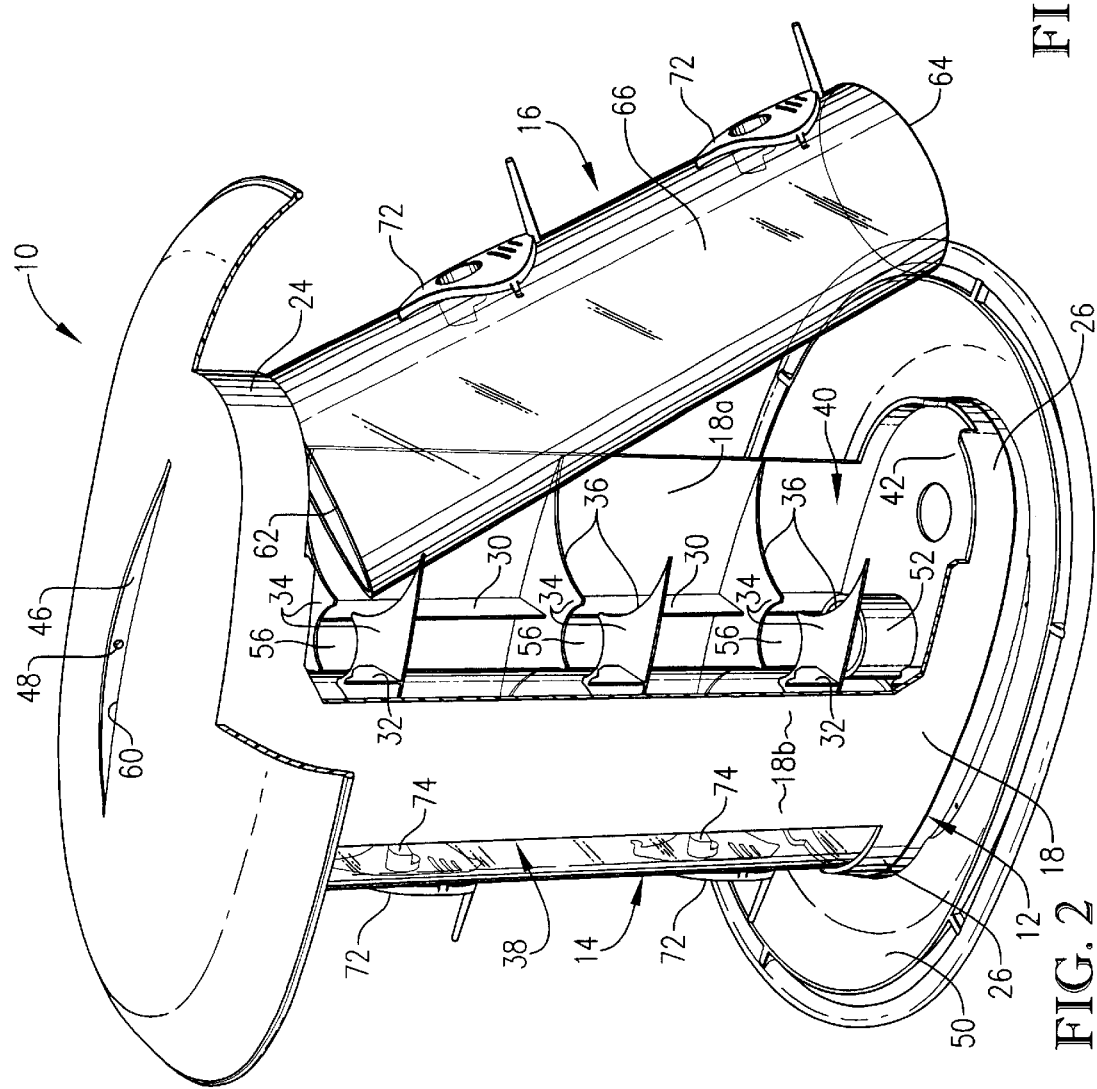
FIG. 2 is an isometric view of the same feeder taken from the opposite end illustrating the manner in which the cartridges may be easily inserted and removed, a portion of the outer wall of the housing and top canopy being broken away to reveal details of construction.
Figure 4:
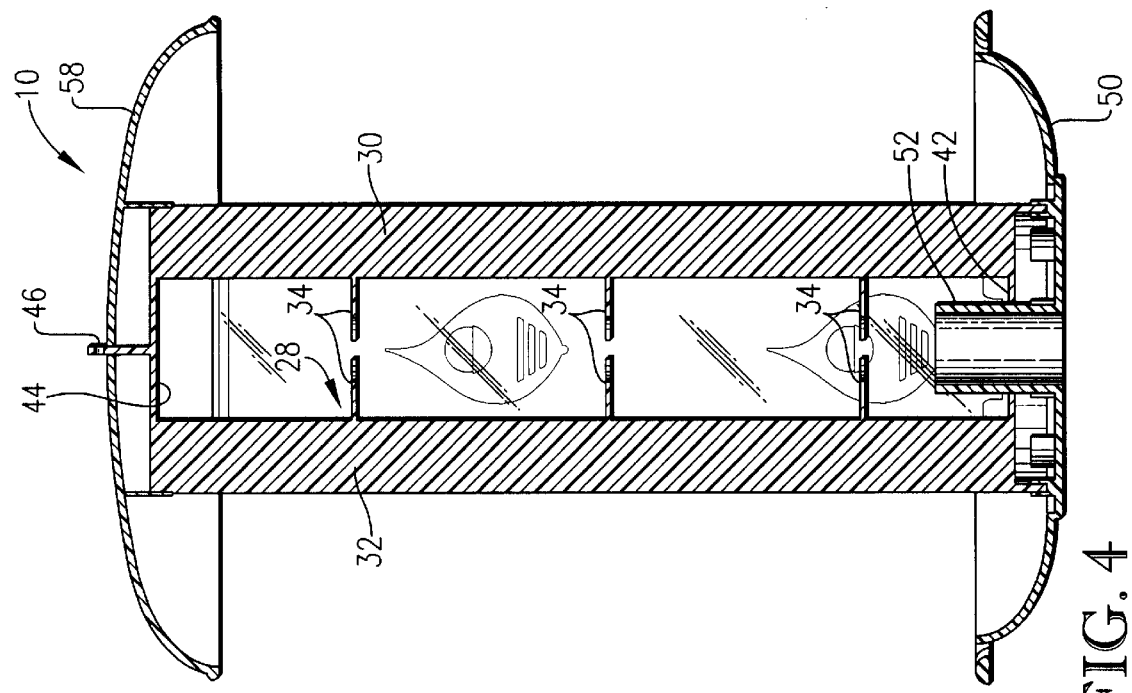
FIG. 4 is a transverse cross sectional view thereof taken centrally of the feeder.

On the other hand, the vertical dimension of clearance space 68 exceeds the height of each lower wall 26 so that by gripping a cartridge and lifting it directly upwardly, the closed bottom 64 thereof can be brought into clearing relationship with lower wall portion 26, permitting the cartridge to be swung out at the bottom as illustrated in FIG. 2 and completely withdrawn from the housing. Reinstallation of the cartridge is a simple reversal of that process.

In the embodiment of FIG. 1, the cartridges 14,16 are designed primarily to attract relatively small song birds. Thus, cartridge sidewall 66 is provided with one or more outlet ports 70 spaced above bottom 64. To prevent feed from escaping through port 70, a combination perch and guard flap 72 of known construction is provided at each port 70, the flap 72 having a deflector 74 that projects into port 70 and essentially covers or shields the latter in its immediate upper vicinity to prevent gravitational discharge of feed therethrough yet permit the birds to access seed by reaching into port 70.

In a gravity-feed version of the feeder, denoted by the numeral 110 in FIGS. 6–8, cartridges 114 and 116 differ from cartridges 14,16 only in the manner in which feed is dispensed. With cartridges 114,116, feed is dispensed by gravity through a single outlet port 170 located generally adjacent cartridge bottom 164 just above lower retaining wall portion 126. Thus, feed escapes by gravity through port 170 and into feeding tray 150 as illustrated in FIG. 6, the feeding action being self-regulating depending upon the volume of feed accumulating outside of port 170 within tray 150.

FIGS. 7 and 8 illustrate that outlet port 170 is provided with a cover flap 172 that overlies and closes off port 170 when cartridge 114 or 116 is being refilled. Flap 172 has three short projections (only two of which are visible) that are used to removably secure flap 172 to the cartridge. The illustrated projections have been denoted by the numerals 172a and 172b and are received within corresponding holes 172a' and 172b' in cartridge sidewall 166 when flap 172 covers port 170 as illustrated in FIG. 7. On the other hand, as illustrated in FIG. 8, flap 172 maybe removed from port 170 and moved to a storage position to allow discharge of feed when the cartridge is properly in place within housing 112. It will be seen that when flap 172 is in its stored position, projections 172a and 172b (as well as a third, not shown projection) are received within corresponding holes 172a", 172b" and 172c".

Thus, feeder 110 is identical to feeder 10 of FIGS. 1–5 with the exception of the particular style of feed cartridges utilized. Because of the commonality of design of the housings 16 and 116, the two types of cartridges can be readily interchanged.

It should be apparent from the foregoing that the present invention provides a wildlife feeder in which the base unit, namely the housing 12 or 112, can remain permanently installed on its means of support at the feeding site. However, the feed cartridges of the feeder can be quickly and easily slipped out of the feeder for refilling or cleaning at a remote location. The filled cartridges can then be just as easily replaced within the feeder.

It will also be seen that the tall window openings at opposite ends of the feeder serve the dual purposes of providing clear visibility to the cartridges (so the level of feed can be easily checked) and providing a means for insertion and removal of the cartridges. The oval transverse configuration of the housing of the feeder also promotes the use of a pair of feeding stations instead of just one, as is typical of many feeders.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A wildlife feeder comprising:

a housing having an upright, outer wall defining a hollow interior, said interior being configured to present at least one holding socket therein; and at least one upright, refillable, feed-dispensing cartridge within said socket, said outer wall having a window opening therein aligned with the socket to permit viewing of the cartridge through the window opening, said housing having structure blocking removal of the cartridge through the top of the housing, said cartridge being removable from and reinsertable into said socket through the window opening to permit refilling of the cartridge outside of the housing, said window opening having a vertical dimension that is less than a corresponding vertical dimension of the cartridge whereby a downwardly projecting upper portion of the housing wall and an upwardly projecting lower portion of the housing wall adjacent the window opening overlap the cartridge and confine the cartridge when the cartridge is in the socket, said housing having a floor upon which the cartridge rests in said socket, said cartridge being manually liftable relative to said floor to permit the lower end of the cartridge to clear the lower portion of the wall and be pivoted out through the window as the cartridge is withdrawn from the socket.

2. A wildlife feeder as claimed in claim 1, said cartridge being transparent.

3. A wildlife feeder as claimed in 1, said cartridge having an open top end through which feed may be loaded into the cartridge when the cartridge has been removed from the housing.

4. A wildlife feeder as claimed in 3, said cartridge being transparent.

5. A wildlife feeder as claimed in claim 4, said structure comprising a canopy over the socket.

6. A wildlife feeder as claimed in claim 1, said structure comprising a canopy over the socket.

* * * * *